US005603451A

United States Patent [19]
Helander et al.

[11] Patent Number: 5,603,451
[45] Date of Patent: Feb. 18, 1997

[54] AESTHETIC THERMOSTAT

[75] Inventors: John W. Helander, 8703 S. Winston Ave., Tulsa, Okla. 74137; David Baumann; Chean F. Fong, both of Tulsa, Okla.; Mark Szewczul, Windsor, Canada

[73] Assignee: John W. Helander, Tulsa, Okla.

[21] Appl. No.: 414,286

[22] Filed: Mar. 31, 1995

[51] Int. Cl.⁶ .................................................. G05D 23/00
[52] U.S. Cl. .......................................... 236/51; 248/309.1
[58] Field of Search ........................... 236/51; 248/309.1, 248/176.1

[56] References Cited

U.S. PATENT DOCUMENTS

| | | | |
|---|---|---|---|
| 4,681,255 | 7/1987 | Drost | 236/51 |
| 4,718,599 | 1/1988 | Brown | 236/46 R |
| 4,815,683 | 3/1989 | Ferrante | 248/309.1 |
| 4,848,609 | 7/1989 | Meghnot | 248/309.1 |
| 5,192,042 | 3/1993 | Wotring et al. | 248/176.1 |
| 5,244,173 | 9/1993 | Kulyk | 248/176.1 |
| 5,272,477 | 12/1993 | Tashima et al. | 340/870.16 |
| 5,305,980 | 4/1994 | Le Blanc | 248/309.1 |
| 5,326,027 | 7/1994 | Sulfstede | 236/51 |
| 5,365,623 | 11/1994 | Springer | 248/309.1 |

*Primary Examiner*—William E. Tapolcai
*Attorney, Agent, or Firm*—Molly D. McKay, P.C.

[57] ABSTRACT

A thermostat for use within a building consisting of a wall-mounted unit and a remote unit movably attached thereto by means of a removable, flexible connecting cable. The remote unit is composed of a separate base portion and a separate movable portion. The base portion is provided with means for attaching the base portion to the back of a room furnishing and the movable portion can removably attach to either the wall-mounted unit when the connecting cable is removed or to the base portion when the connecting cable is reattached. The base portion is provided with "U" shaped sides which form a track for movably receiving the movable portion when the movable portion is disengaged from the wall-mounted unit.

7 Claims, 4 Drawing Sheets

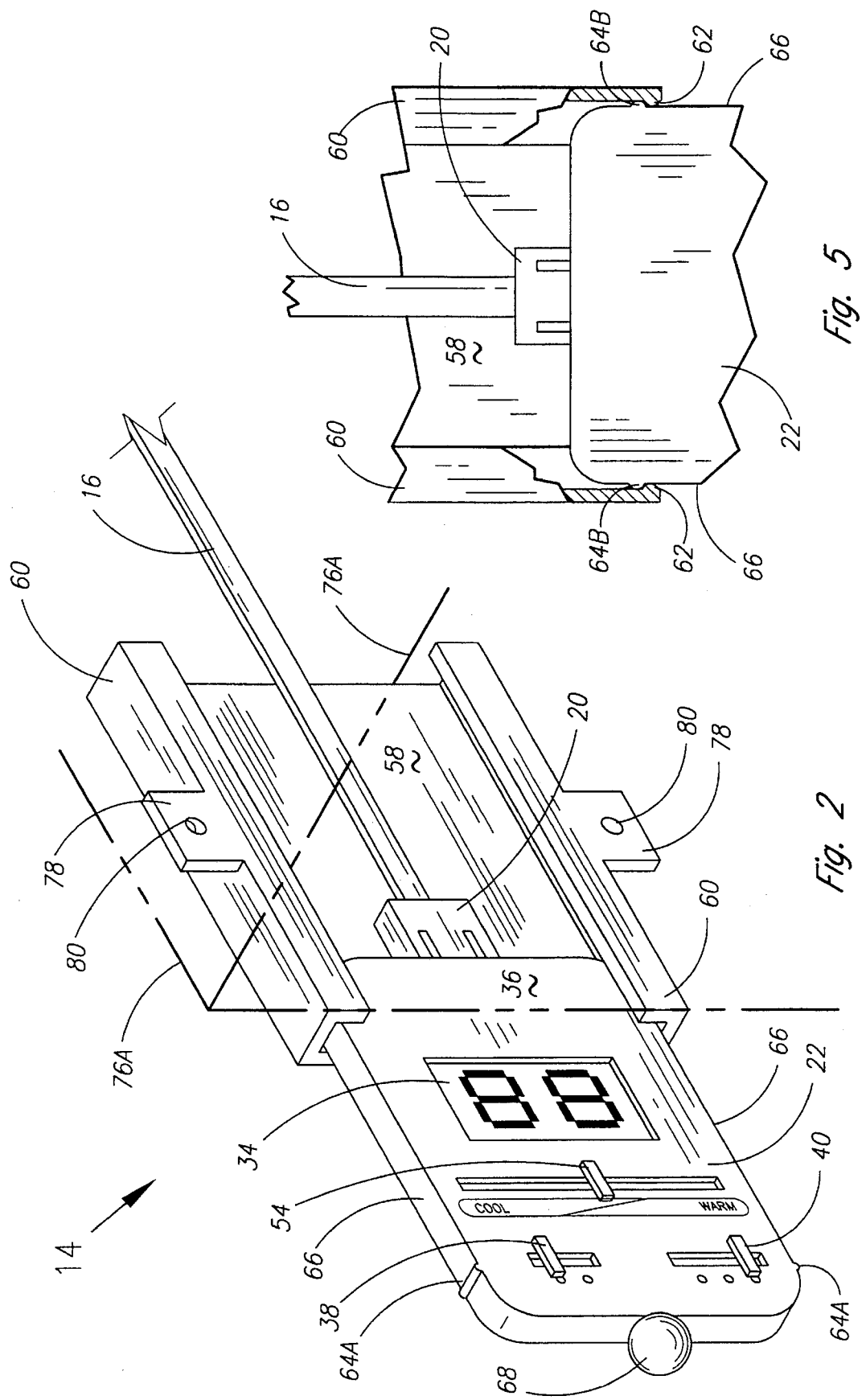

AESTHETIC THERMOSTAT

BACKGROUND OF THE INVENTION

1. Field of the Invention

The present invention relates to a new type of thermostat for use in a building. More specifically, the invention relates to a thermostat consisting of two interconnected units, a wall-mounted unit and a remote unit which may be removably attached to either the wall-mounted unit or by use of a separate base portion attached to the back of a furnishing such as a picture or a piece of furniture.

2. Description of the Related Art

Most thermostats in use in today's buildings consist of a single wall-mounted unit. Generally, these wall-mounted thermostats are placed in the middle of a wall at approximately eye level for the building's occupants. These wall-mounted thermostats normally extend outward into the room, anywhere from one to two and one-half inches beyond the wall surface.

Placement of the thermostat is normally dictated by its function rather than its appearance. Thus, often the location of a thermostat is aesthetically undesirable. Users must have access to the controls located on the thermostat in order to control the building temperature. However, since most wall-mounted thermostats extend outward from the walls on which they are mounted and are placed in the middle of the walls, the location of the thermostats can hamper placement of furnishings within the rooms.

The present invention addresses these problems by providing a thermostat with a flush mounting wall unit connected via cable to a thin profile remote unit which can be removably attached to either the wall unit or to the back of furnishings such as pictures or furniture. The remote unit contains the controls which need to be accessed by the user and which can be reached by pulling on the remote unit, causing a movable portion of the remote unit to move from behind the furnishing along a track provided on a base portion of the remote unit. When the user no longer needs to access the controls, the movable portion of the remote unit can again be pushed along its track so that both the base portion and the movable portion of the remote unit reside behind and are concealed by the furnishing. The movable portion of the remote unit is provided with a liquid crystal display which displays the ambient indoor air temperature and also contains controls for turning the heating or cooling systems on or off, turning the fan on or to automatic operation and regulating the building's indoor air temperature.

SUMMARY OF THE INVENTION

The present invention is a thermostat for use inside a building. The thermostat consists of two interconnected units, i.e., a wall-mounted unit which is electrically connected to a fan, heater and air conditioner of a HVAC system and a remote unit consisting of a base portion and a movable portion.

The movable portion of the remote unit is electrically connected to the wall-mounted unit via a removable, flexible connecting cable. The wall-mounted unit contains a 12 v D.C. battery supply which provides power to the movable portion of the unit via the connecting cable.

The movable portion of the remote unit is provided with a controller which receives temperature input from a sensor which is also provided on the movable portion of the remote unit. The sensor provides electrical input to an analogue to digital (A/D) converter provided on the movable portion of the remote unit. The A/D converter then provides electrical input to an liquid crystal display (LCD) driver which is physically a part of the same microchip in the remote unit as the A/D converter. The LCD driver provides electrical input to an LCD device located on the face of the movable portion of the remote unit in order to display thereon the ambient room temperature in degrees Fahrenheit.

The controller also receives electrical inputs from a fan switch and a heating/cooling switch which are both located on the face of the movable portion of the remote unit. The face of the movable portion of the remote unit also is provided with a temperature controlling slide bar which physically attaches to a potentiometer provided in the movable portion. The potentiometer provides electrical input to the controller. Based on the inputs received by the controller from the fan switch, the heating/cooling switch and the potentiometer, the controller operates the fan, the heater and the air conditioner in order to regulate the temperature and air flow inside the building. The controller operates the fan, heater and air conditioner via electrical signals which are transmitted to the HVAC system from the controller. These electrical signals pass consecutively from the controller to the connecting cable which connects the remote unit to the wall-mounted unit, from the connecting cable to the fan, heater and air conditioner relays provided in the wall-mounted unit, then from the relays, respectively, to the fan, heater and air conditioner via the electrical connections running from the wall-mounted unit to the HVAC system.

The base portion is removably attachable to the back of a room furnishing such as a picture or piece of furniture. The movable portion is removably attachable to the wall-mounted unit when the connecting cable is removed and, alternately, removably attachable to the base portion when the connecting cable is reattached. The base portion forms a track along which the movable portion of the remote unit is able to be slidably received. The movable portion is provided with stopping ridges which engage a lip provided within the track on the base portion for preventing the movable portion from slipping out of the track under the force of gravity. In order to slide the movable portion outward relative to the track or to disengage the movable portion from the base portion, a knob is provided on the movable portion which the user can use to grip the movable portion in order to pull the stopping ridges beyond the lip.

BRIEF DESCRIPTION OF THE DRAWINGS

FIG. 2 is a perspective view of a remote unit of the thermostat of FIG. 1 shown attached horizontally to the back of a piece of furniture with the piece of furniture shown in outline.

FIG. 5 is an enlarged cut away view of a portion of the remote unit shown in FIG. 3.

DETAILED DESCRIPTION OF THE PREFERRED EMBODIMENT

Figure 1:
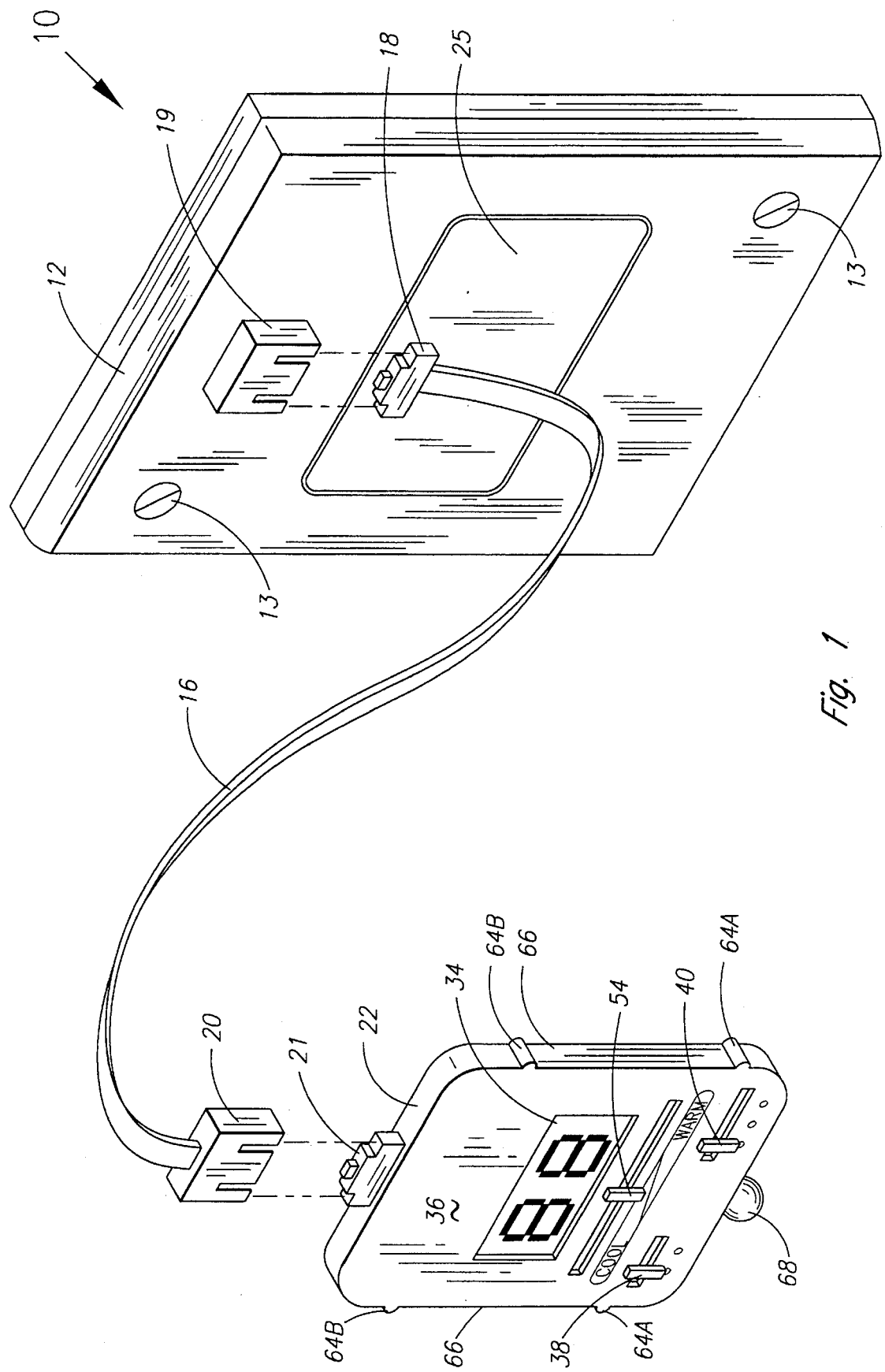
FIG. 1 is a perspective view of an aesthetic thermostat constructed according to a preferred embodiment of the present invention with a base portion of the thermostat removed.

Referring now to the drawings and initially to FIG. 1, there is illustrated an aesthetic thermostat 10 constructed according to a preferred embodiment of the present invention. The thermostat 10 consists of a wall-mounted unit 12 and a remote unit 14, shown in FIG. 2, which are interconnected by means of a flexible connecting cable 16. The cable 16 has a first male end 18 which connects electrically to the wall-mounted unit 12 via a female quick connect/disconnect coupling 19 provided on the wall-mounted unit 12. The cable 16 also has an opposite second female end 20 which connects electrically to a movable portion 22 of the remote unit 14 via a male quick connect/disconnect coupling 21 provided on the movable portion 22, as will be explained in more detail hereafter. The wall-mounted unit 12 attaches to a wall of a building by means of screws 13 or other similar fastening devices which insert through screw openings 15, shown in FIG. 6.

Figure 6:
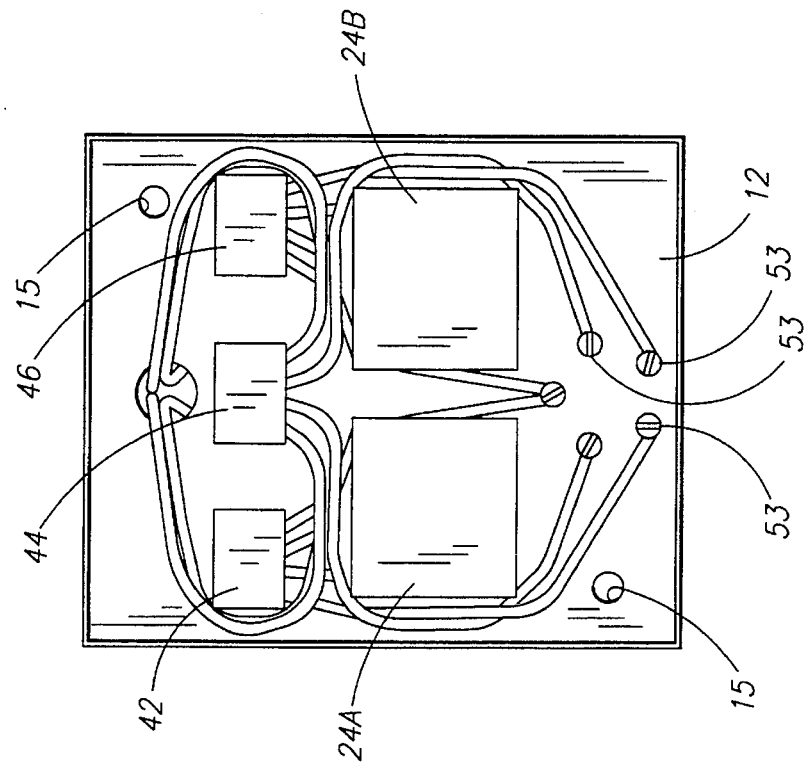
FIG. 6 is a rear elevation of the wall-mounted unit.
Figure 4:
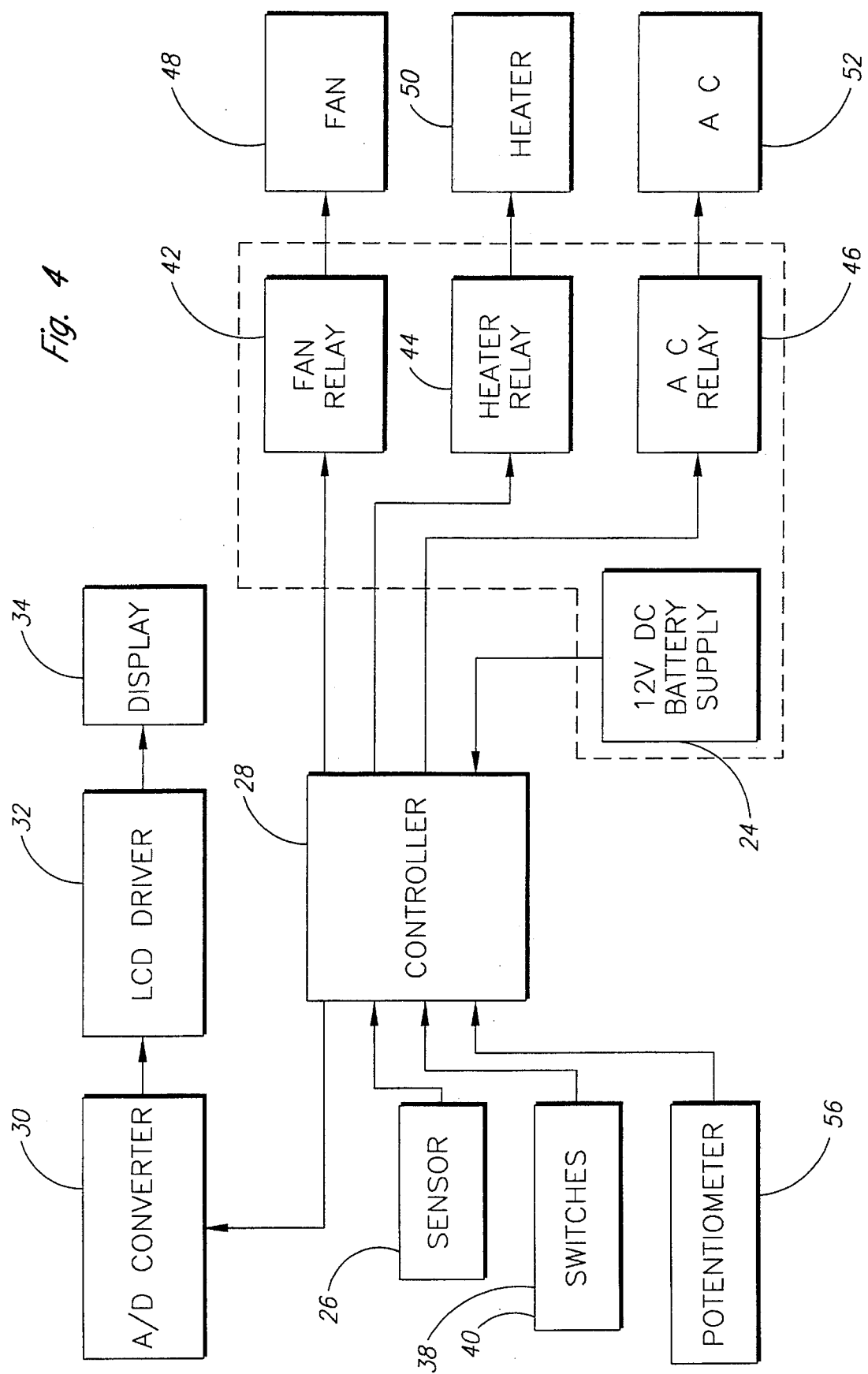
FIG. 4 is a block diagram illustrating the major electrical components of the aesthetic thermostat.

Referring now to FIG. 1, to FIG. 4 which shows the aesthetic thermostat 10 diagrammatically, and to FIG. 6, a 12 volt (v) direct current (DC) battery supply 24 which is comprised of two electrically interconnected batteries 24A and 24B is located in the wall-mounted unit 12 and supplies electrical power via the connecting cable 16 to the movable portion 22 of the remote unit 14. The wall-mounted unit 12 is provided with a removable battery access cover 25 which allows access to the batteries 24A and 24B without removing the wall-mounted unit 12 from the wall. With regard to FIG. 4, boxes located within the area surrounded by the broken line are located in the wall-mounted unit 12, boxes located to the left thereof are located in the movable portion 22 of the remote unit 14, and boxes located to the right thereof are not part of the thermostat 10 but are part of the building's heating, ventilation, and air conditioning (HVAC) system. A temperature sensor 26 is provided in the movable portion 22 which senses the ambient temperature and sends an electrical signal to a controller 28 also provided in the movable portion 22. The controller 28 then sends an electrical signal to an analogue to digital (A/D) converter 30 also provided in the movable portion 22. The A/D converter converts the electrical analogue signal to a digital signal. The digital signal is then sent to a liquid crystal display (LCD) driver 32 provided in the movable portion 22. The LCD driver 32 uses the digital signal to display the ambient room temperature in degrees Fahrenheit on an LCD device 34. The LCD device 34 is located on a face 36 of the movable portion 22.

A movable fan switch 38 and a movable heating/cooling switch 40 are also provided on the face 36 of the movable portion 22. Each switch 38 and 40 is electrically connected to the controller 28, which in turn is electrically connected via the cable 16 to a fan relay 42, a heater relay 44 and an air conditioner relay 46, all three of which are provided in the wall-mounted unit 12. The relays 42, 44, and 46, which generate a small amount of heat, are provided in the wall-mounted unit 12 in order to separate them from the temperature sensor 26 provided in the movable portion 22 so that the heat generated by the relays 42, 44 and 46 will not affect the operation of the temperature sensor 26. The relays 42, 44 and 46 connect electrically respectively to a fan 48, a heater 50 and an air conditioner 52, provided in the building's HVAC system which is located remotely from the thermostat 10. Although the fan 48, heater 50 and air conditioner 52 are located remotely from and are not a part of the thermostat 10, they are electrically connected to the wall-mounted unit 12 via electrical connections (not shown) which attach to electrical terminals 53 provided in the wall-mounted unit 12. Such electrical connections are typical of those found running between other types of thermostats and their associated HVAC systems.

The face 36 of the movable portion 22 is also movably provided with a temperature controlling slide bar 54. The slide bar 54 is physically attached to a potentiometer 56 provided in the movable portion 22. The potentiometer 56 sends an electrical signal to the controller 28 which employs this signal in conjunction with input from the sensor 26 and the switches 38 and 40 to control the operation of the fan 48, heater 50 and air conditioner 52 in order to maintain the desired temperature within the building.

Referring now to FIGS. 1, 2 and 5, the remote unit 14 is comprised of a separate base portion 58 and the movable portion 22 which can be separated from the base portion 58. The base portion 58, when viewed in cross-section, is provided with inwardly facing "U" shaped sides 60 so that the "U" shaped sides 60 form a track into which the movable portion 22 can be removably inserted. At least one of the "U" shaped sides 60 is provided with a lip 62, illustrated in FIG. 5, which is engagable with two stopping ridges 64A and 64B provided on one or both sides 66 of the movable portion 22 in order to releasable lock the movable portion 22 within the base portion 58. The stopping ridges 64A and 64b are preferably located at opposite ends of either one or both of the sides 66, as illustrated in FIG. 1. The sides 66 are provided on the movable portion 22 adjacent to the face 36 so that the face 36 lies between the sides To unlock the movable portion 22 from the base portion 58 so that the movable portion 22 can be slid outward relative to the base portion 58, as illustrated in FIG. 2, a pulling force is exerted on the movable portion 22. This pulling force causes the first stopping ridge 64A to jump over the lip 62 and allows the movable portion 22 to slide within the track formed by the "U" shaped sides 60 until the second stopping ridge 64B engages the lip 62. The movable portion 22 is preferably provided with a knob 68 by which the movable portion 22 can be gripped and pulled or pushed in order to slide the movable portion 22 within the base portion 58.

Then in order to remove the movable portion 22 completely from the base portion 58, a second pulling force is exerted on the movable portion 22, causing the second stopping ridge 64B to jump over or slide past the lip 62 and allowing the movable portion 22 to slide out of the track formed by the "U" shaped sides 60.

Alternately, instead of removing the movable portion 22 from the base portion 58, the movable portion 22 can be pushed back into its original locked position so that the first stopping ridge 64A re-engages the lip 62.

If, on the other hand, the movable portion 22 has been removed from the base portion 58, the movable portion 22 can be removably attached to the wall-mounted unit 12. If this is desired, the connecting cable 16 is first removed from the thermostat 10 by disconnecting the first male end 18 and the second female end 20 from, respectively, the female and the male quick connect/disconnect couplings 19 and 21.

Once the connecting cable 16 is removed from the thermostat 10, the movable portion 22 may be attached to the wall-mounted unit 12 by engaging the female and male quick connect/disconnect couplings 19 and 21, causing the movable portion 22 and the wall-mounted unit 12 to make direct electrical connection with each other. In order to remove the movable portion 22 from the wall-mounted unit 12, the knob 68 can be grasped and pulled, thereby causing the female and male couplings 19 and 21 to disengage, thus, separating the movable portion 22 from the wall-mounted unit 12. The connecting cable 16 can then be reattached so that the movable portion 22 can again be used remotely from the wall-mounted unit 12.

Figure 3:
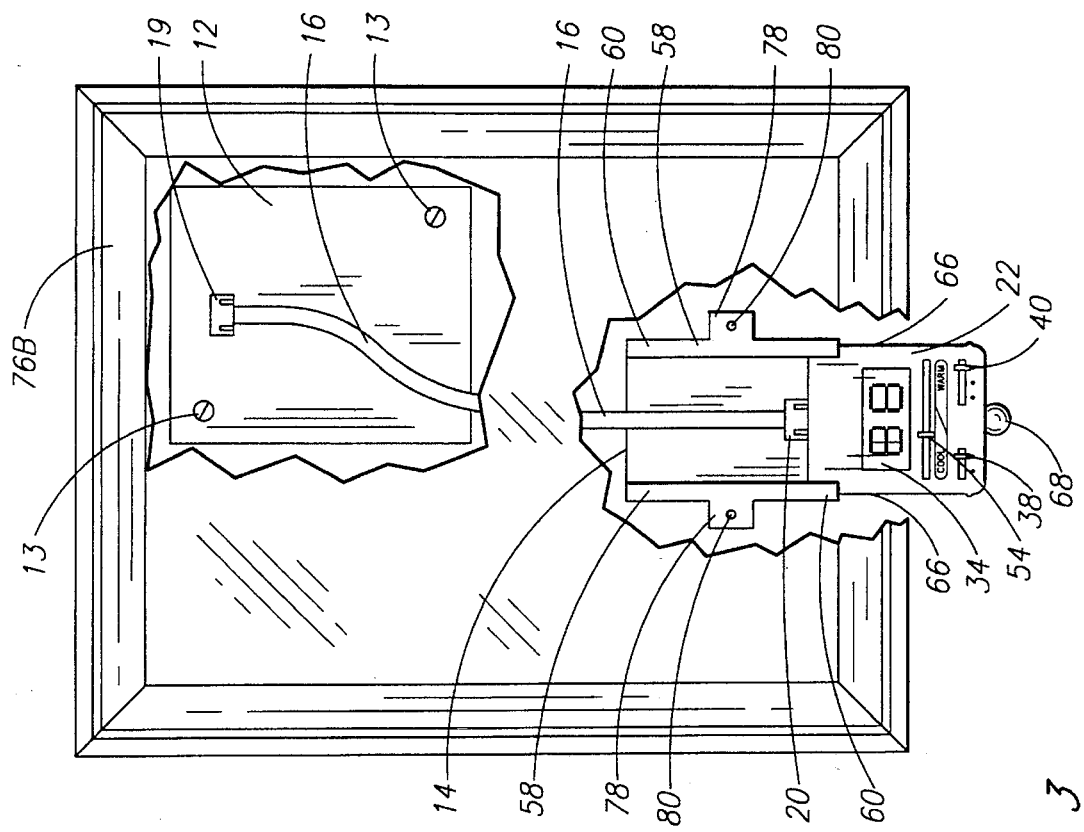
FIG. 3 is a partially cut away view of the aesthetic thermostat of FIG. 1 shown with the base portion of the remote unit attached to the back of a picture.

The base portion 58 may be removably attached either vertically or horizontally to a back side of a room furnishing 76, such as a piece of furniture 76A, as illustrated in FIG. 2, or such as a picture 76S, as illustrated in FIG. 3. The base portion 58 is optionally provided with ears 78 which extend outward from the "U" shaped sides 60 as a means for attaching the base portion 58 to the furnishing 76. The ears 78 may each be provided with a fastener opening 80 through which a fastener (not illustrated) such as a screw or bolt can be inserted in order to secure the base portion 58, to the back side of the furnishing 76. Alternately, the base portion 58 may be permanently glued to the furnishing 76, removably attached by means of VELCRO® brand fastening strips or either permanently or removably attached by other suitable fastening means.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A thermostat for use inside a building comprising:

a wall-mounted unit, a remote unit comprised of a base portion and a movable portion; a connecting cable flexibly connecting said remote unit to said wall-mounted unit and means for movably attaching said remote unit to a room furnishing, said base portion provided with said means for movably attaching said remote unit to a room furnishing, said a movable portion being removably received by said base portion, said connecting cable being attached to said movable unit in order to flexibly connect said remote unit to said wall-mounted unit, said base portion being provided with "U" shaped sides which form a track for movably receiving said movable portion, and a knob being provided on said movable portion for gripping said movable portion.

2. A thermostat according to claim 1 further comprising:

stopping ridges being provided on at least one side of the movable portion and at least one lip being provided within said "U" shaped sides so that the stopping ridges engage said lip as the movable portion is received into the base portion.

3. A thermostat according to claim 2 further comprising:

said movable portion being provided with a face located adjacent said at least one side, said face being provided with a temperature controlling slide bar.

4. A thermostat according to claim 3 further comprising said face being provided with a fan switch.

5. A thermostat according to claim 3 further comprising said face being provided with a heating/cooling switch.

6. A thermostat according to claim 3 further comprising said face being provided with an LCD device for displaying ambient room temperature.

7. A device for controlling the operation of a building's HVAC system comprising:

a wall-mounted unit, a movable portion flexibly connected to said wall-mounted unit via an electrical connecting cable, a separate base portion, said base portion being provided with ears for attaching said base portion to a back side of a room furnishing, said base portion having receiving means for movably receiving said movable portion, and a knob being provided on said movable portion as a means to grip the movable portion.

\* \* \* \* \*